United States Patent

Marshall et al.

[15] 3,646,713
[45] Mar. 7, 1972

[54] METHOD OF MAKING FRAGMENTED CRYSTALLINE MATERIAL

[72] Inventors: Douglas Woodworth Marshall, Niagara Falls, Ontario; Edgar A. Pett, Chippawa, Ontario, both of Canada

[73] Assignee: Norton Company, Worcester, Mass.

[22] Filed: Mar. 16, 1970

[21] Appl. No.: 19,736

Related U.S. Application Data

[60] Continuation-in-part of Ser. No. 679,277, Sept. 22, 1967, abandoned, which is a division of Ser. No. 482,654, July 8, 1965, Pat. No. 3,377,660, which is a division of Ser. No. 104,317, Apr. 20, 1961, abandoned.

[52] U.S. Cl..................................51/309, 51/293, 264/57, 264/65, 264/144, 264/332
[51] Int. Cl.............................................B24d 3/02
[58] Field of Search ..............264/57, 65, 140, 144; 51/293, 51/309; 65/21, 33, 97

[56] References Cited

UNITED STATES PATENTS

| | | | |
|---|---|---|---|
| 2,755,509 | 7/1956 | Smidth | 264/140 |
| 3,175,894 | 3/1965 | Foot | 51/309 |
| 3,278,284 | 10/1966 | Dolah et al. | 51/309 |
| 3,486,189 | 12/1969 | Lau et al. | 264/140 |

*Primary Examiner*—Donald J. Arnold
*Attorney*—Allan R. Redrow

[57] ABSTRACT

A method utilizing a trough for flowing molten abrasive material from a furnace onto a cool rotating casting cylinder, rapidly solidifying it into a thin semisolid curved sheet, densifying the semisolid material with a pressure roll, and then partially fracturing the strip of semisolid material by reversing its curvature by pulling it away from the cylinder with a driven rapidly cooled conveyor means whereupon the partially fractured strip is deposited onto collecting means in the form of large fragments which upon being rapidly cooled and solidified break up into smaller fragments well adapted to be reduced in size to form conventional abrasive particles.

12 Claims, 1 Drawing Figure

PATENTED MAR 7 1972 3,646,713
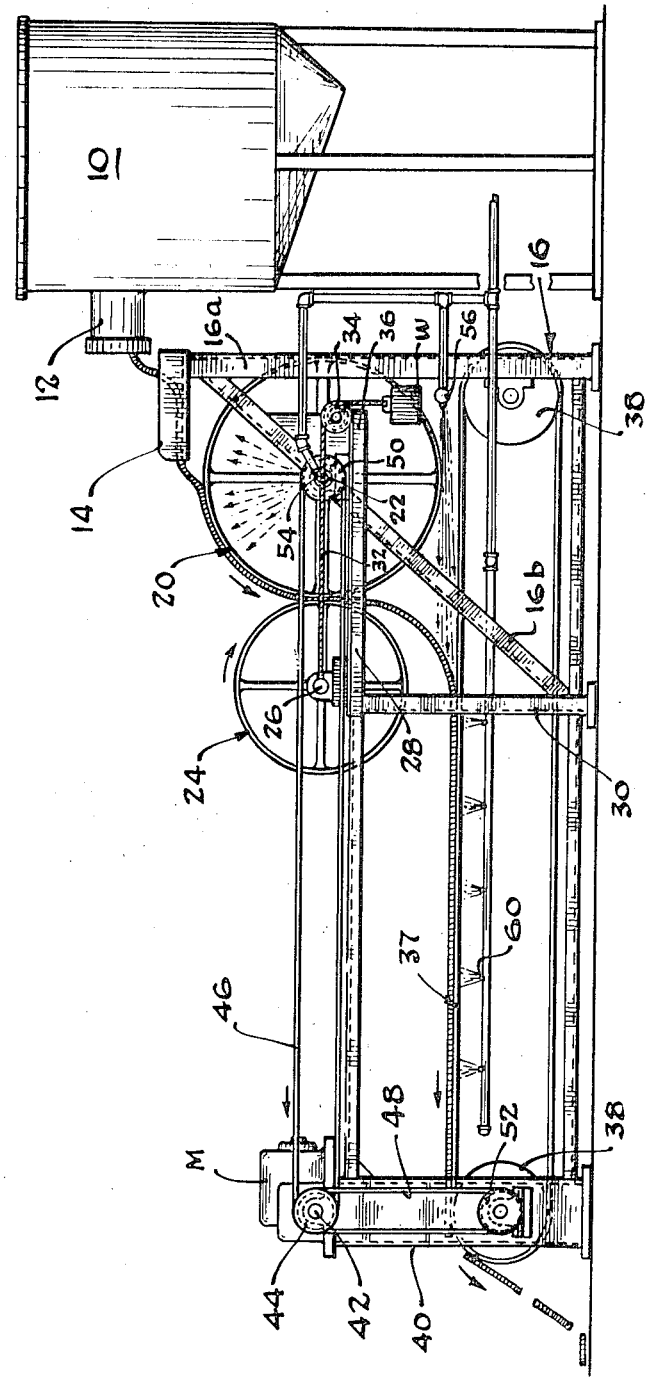
Inventors.
DOUGLAS W. MARSHALL
EDGAR A. PETT
Allan R Redrow
Attorney

METHOD OF MAKING FRAGMENTED CRYSTALLINE MATERIAL

CROSS-REFERENCE TO RELATED CASES

This application is a continuation-in-part of application Ser. No. 679,277 filed Sept. 22, 1967 now abandoned which is a division of application Ser. No. 482,654 filed July 8, 1965, now U.S. Pat. No. 3,377,660 which is a division of application Ser. No. 104,317 filed Apr. 20, 1961, now abandoned.

BACKGROUND OF THE INVENTION

Currently, aluminous abrasive is made from a suitable mixture of bauxite ore fused in 10 to 15 ton batches and allowed to cool for a period of of a week or more in the form of large pigs. These pigs are then broken up with sledge hammers and the resulting fragments sorted to separate the high-grade product from the impurities and reclaims. This method is expensive, arduous and time consuming and, because of the length of the time required to effect cooling, the crystal size is generally coarse to intermediate. Alumina cooled slowly in large batch-type water-cooled furnaces has, for example, a crystal size of from between 50 and 80 percent monocrystalline in 24 grit while a similar aluminous abrasive poured into a 300-pound ingot mold will vary from 25 to 70 percent monocrystalline in a 24 grit.

SUMMARY OF THE INVENTION

An object of this invention is to make very fine crystalline alumina abrasive having a crystal size in the order of less than 1 percent monocrystalline in 24 grit and containing as little as 4 to 14 percent monocrystalline in 80 grit and, by reason of this fineness, to provide a grain which withstands impact and wear a great deal better than the coarse grain material now produced and which, therefore, is superior to coarse grain crystal for snagging operations.

In accordance with the method herein disclosed, molten abrasive-forming material is deposited in a relatively thin curved strip, partially solidified by cooling, partially fragmentized by changing its curvatures while still somewhat plastic, further cooled to effect solidification and fragmentization, and finally crushed. Preferably, although not necessarily the strip is compressed while still partially plastic and prior to changing its curvature. More specifically, the molten material is flowed in a thin layer onto the upper curved surface of a rotating cylinder, partially solidified as fast as it is flowed onto the surface by maintaining the surface at a temperature substantially below the melting point of the material, and then doffed while still partially solid by delivering it from the lower portion of the cylinder to a subjacent, substantially flat surface moving away from the downwardly moving surface of the cylinder to effect fragmentization and cooling. The cooled fragments are then crushed for use.

The apparatus, as herein disclosed, for carrying out the foregoing method, comprises a quenching cylinder mounted for rotation about its longitudinal axis, a trough arranged above the upper part of the quenching cylinder for flowing molten material onto the upper surface of the quenching cylinder as it rotates, means for cooling the surface of the quenching cylinder partially to solidify the material as it is spread on the surface, and means for effecting rotation of the quenching cylinder gravitationally to doff the partially solidified strip at its lower side. A conveyor is disposed subjacent the quenching cylinder having a horizontal surface, and there is means for effecting movement of the surface away from the downwardly moving side of the quenching cylinder to assist in pulling the strip away from the surface of the cylinder to effect further fragmentization and cooling. A squeeze cylinder of smaller diameter than the quenching cylinder is arranged parallel to the quenching cylinder with its surface closely adjacent the surface of the quenching cylinder and there is means for varying the pressure between the surfaces of the cylinders. There is also means for spraying a coolant interiorly of the quenching cylinder and on the surfaces of the conveyor.

BRIEF DESCRIPTION OF THE DRAWING

The invention will now be described in greater detail with reference to the accompanying drawing which is a diagrammatic illustration of the apparatus shown in side elevation for carrying out the method.

DESCRIPTION OF THE PREFERRED EMBODIMENTS

The apparatus, as herein illustrated, comprises a standard tapping furnace 10 from which the fused product of which the abrasive is to be made is discharged through a spout 12 into a horizontally disposed graphite trough 14, the latter being supported at its opposite ends, subjacent the spout 12, by transversely spaced, inverted V-shaped frames 16—16, each of which has vertically disposed and inclined legs 16a—16a and 16b—16b. The forward side of the trough 14 is open and a quenching cylinder 20, having a diameter in the order of 28 inches, is mounted below the trough for rotation about its longitudinal axis on a shaft 22, the latter being journaled at its ends on the inclined legs 16b—16b of the frames 16—16. A squeeze cylinder 24, which has a diameter in the order of 20 inches, is mounted in a horizontal position forwardly of the cylinder 20 on a shaft 26 parallel to the shaft 22. The opposite ends of the shaft 26 rest on transversely spaced horizontally disposed tracks 28—28, the rear ends of which are fastened to the inclined legs 16b—16b and the forward ends of which are supported by the upper ends of vertically disposed legs 30—30. The lower ends of the legs 30—30 are fixed to the inclined legs 16b—16b. The cylinder 24 is thus free to move bodily toward the cylinder 20 and when no product is flowing through the system its surface is held in contact with the surface of the cylinder 20 by weights W—W suspended from the rear ends of the flexible cables 32-32, connected at their forward ends to the ends of the shaft 26 and extending rearwardly therefrom over the pulleys 34—34, the latter being mounted on brackets 36—36 fixed to the legs 16b—16b.

Below the cylinders 20 and 24 there is a conveyor in the form of a continuous belt 37 entrained at its ends about horizontally disposed drums 38—38, one of which is supported at its ends by the legs 16a—16a and the other of which is supported at its ends by legs 40—40. The upper surface of the belt 37 is situated about 14 inches below the line of contact between the cylinders 20 and 24.

The legs 40—40 also support a motor M and drive shaft 42 on which there are multiple sheave sprockets 44—44 about which are entrained roller chains 46—46 and 48—48. The opposite ends of the roller chain are entrained about pulleys 50—50 and 52—52 mounted, respectively, on the ends of the shaft 22 supporting the cylinder 20 and the shaft supporting the drum 38. The cylinder 20 is driven at about 10 to 15 revolutions per minute and the upper run of the conveyor is driven at a speed of about 90 feet per minute.

A spray head 54 in the form of a pipe is disposed within the cylinder 20 parallel to its axis of rotation in a position to direct jets of water against the inner side of the cylinder near the top. By this means, the temperature of the cylinder may be kept well below that of the melting point of the steel which is 1,350° C. A spray head 56 is mounted parallel to and adjacent the rear one of the drums 38 at the level of the upper run of the conveyor, so as to project jets of water along the upper surface of the belt toward the area upon which the material falls from the quenching cylinder 20, and additional spray heads 60 are disposed beneath the underside of the upper run of the conveyor for directing jets of water against its underside.

In accordance with the method herein described, the product is 95 percent alumina produced from bauxite ore by reduction with coke or coal in the furnace 10 and discharged therefrom at a temperature of about 2,000° C. into the graphite trough 14 from which it flows forwardly onto the upper surface of the rotating quenching cylinder 20, spreading out thereon in the form of a strip of about 12 inches and one-sixteenth to one-eighth inches thick. Since the quenching cylinder 20 is kept at a temperature well below the melting point of the steel (1,350° C.) by the water cooling, the strip commences to solidify as it contacts the cylinder and hence to take the shape of the outwardly convex surface of the cylinder. The strip, however, is still plastic when it reaches the squeeze cylinder 24 so that, when it passes between the surface of the quenching cylinder 20 and the squeeze cylinder 24, it is compressed thus reducing the macroporosity. As the strip leave the line of contact between the cylinders 20 and 24 it commences to break away from the surface of the cylinder 20 by reason of its own weight and fall to the upper surface of the conveyor 37, however, since the strip is still somewhat plastic, it retains enough continuity so that the part resting on the conveyor, at any time, and moving forwardly therewith, assists in pulling the part still on the cylinder from the surface of the cylinder. The deadweight of the suspended strip, that is, the part hanging down from the cylinder plus the forward pull which reversely bends the strip as it leaves the cylinder, initiates breaking it into fragments about 12 inches square. As these fragments move forwardly on the conveyor further cooling breaks them into still smaller pieces.

When examined in cross section the product discloses a dark dense fine crystal structure of 1 to 30 microns containing some macropores in contrast to furnace Alundum which is brown to pink in color, waxy in appearance, and has a crystal size of 500 microns ±100 in length. Stated according to another method of indicating crystal size, the product has a count of less than 1 percent in 24 grit and 4 to 14 percent in 80 grit. The term "monocrystal" refers to the percentage of whole crystals in any grit size. Crystals produced according to the method are much stronger than coarsely crystal materials and have a superior resistance to wear.

The invention is generally applicable to fused metal oxide materials selected from the group consisting of alumina, zirconia, and magnesia and mixtures thereof and especially those used for abrasives. By "aluminous abrasive" is meant zirconia and alumina-chromia type and usually contain at least 90 percent alumina. Special types of abrasives some or any abrasive material consisting essentially of alumina, or an alumina-alloy type or an alumina-solid solution type of abrasive product, containing alumina as an ingredient. The commercially produced alumina-zirconia abrasives, containing usually from 10 to 60 percent zirconiz are an example of the alloy type. Alumina-titania and alumina-chromia are examples of the solid solution types of abrasives may also be produced in which some or all of the alumina is combined with magnesia to form spinel instead of alpha-alumina. In all of these abrasives alumina is a major and essential component.

Other molten metal oxides such as zirconia with or without minor amounts of ceria, yittria, or calcium oxide as a stabilizer may be processed by the method taught herein.

The principal advantages of the apparatus and method described reside in that the product is finely crystalline; that the time required for making it is drastically reduced; for example, within 10 to 15 minutes after it is poured, it can be crushed for shipment or used in making grinding wheels; and that it can be made much cheaper because it can be more easily crushed and requires less handling and labor.

In the apparatus and method carried out thereby, as described above, the strip of semisolid or plastic alumina is squeezed between the quenching cylinder and squeezing cylinder for the purpose of reducing macroporosity, that is, the pores visible to the unaided eye. It is quite possible, however, to omit the squeezing cylinder and still obtain much finer crystals than with conventional methods of furnace casting due to the fact that quenching can be effected rapidly enough so that the crystals do not have time to grow. Moreover, although the molten material is deposited on the external surface of a cylinder for quenching, it could be deposited on the internal surface of a cylinder, doffed therefrom by rotation, and spilled axially from one end, for example, by inclining the cylinder.

It should be understood that the present disclosure is for the purpose of illustration only and that this invention includes all modifications and equivalents which fall within the scope of the appended claims.

What is claimed is:

1. The method of making fine crystalline fused metal oxide material selected from the group consisting of alumina, alumina-alloy, alumina-solid solution, zirconia, stabilized zirconia containing yittria, ceria or calcium oxide, magnesia and mixtures thereof which comprises, forming a relatively thin plastic curved strip from molten metal oxide material at approximately 2,000° C. on one side of a curved cooler surface, positively cooling the surface at least a temperature below 1,350° C. by circulating a coolant on the other side thereof, delivering the strip from the surface to a substantially flat surface maintained at a temperature lower than the curved surface, the flat surface moving away from the curved surface to effect pulling, reverse bending, and fracturing of the strip near the reverse bending zone, cooling, solidifying, and conveying the fractured material away to be crushed into smaller pieces.

2. The method of claim 1 wherein the molten material is quenched on the upper part of the curved surface of a rotating cylinder, and the plastic strip is delivered downwardly from the lower portion of the cylinder onto the flat surface that is disposed below the cylinder.

3. The method of claim 2 wherein the strip is bent reversely to the curvature of the cylinder after it is removed from the surface thereof as it is delivered to the flat surface.

4. The method of claim 2 wherein the strip is partially cooled to render it plastic on contact with the cylindrical surface and is further cooled thereon until it is delivered to the lower portion thereof.

5. The method of claim 2 wherein the strip is cooled on the surface of the cylinder to form a plastic but friable sheet.

6. The method of claim 2 wherein the strip is fractured and delivered from the lower portion to the flat surface.

7. The method of claim 2 wherein the strip is cooled to form a plastic strip as it flows onto the surface and squeezing the strip to reduce its macroporosity.

8. The method of claim 7 wherein the squeezing action is produced by forcing a second curved surface against the partially solidified strip, the second curved surface having a sharper curved configuration as compared with the first curved surface upon which the strip is first deposited.

9. The method of making a fine crystalline fused metal oxide material selected from the group consisting of alumina, alumina-alloy, alumina-solid solution, magnesia, zirconia, stabilized zirconia containing yittria, ceria or calcium oxide, and mixtures thereof which comprises, pouring the metal oxide material in molten form in a thin curved strip, partially solidifying the thin curved strip to render it plastic by exposing it to a temperature below 1,350° C., bending the partially solidified curved strip to fracture it and then further cooling the fractured material.

10. The method of claim 9 wherein the plastic strip is an aluminous material that is subjected to a squeezing action before it is bent to fracture it.

11. The method of claim 9 wherein the material is an aluminous abrasive product.

12. The method of claim 9 wherein the molten strip is deposited on a curved support to be rendered plastic and the strip is then fractured by bending it in a reverse direction to the direction of the curved support and cooling the fractured material.

* * * * *